United States Patent [19]

Knapp

[11] Patent Number: 4,671,245
[45] Date of Patent: Jun. 9, 1987

[54] THROTTLE VALVE PIPE

[75] Inventor: Heinrich Knapp, Leonberg, Fed. Rep. of Germany

[73] Assignee: Robert Bosch GmbH, Stuttgart, Fed. Rep. of Germany

[21] Appl. No.: 854,352

[22] Filed: Apr. 21, 1986

[30] Foreign Application Priority Data

Jul. 31, 1985 [DE] Fed. Rep. of Germany ........ 3527380

[51] Int. Cl.$^4$ .................... F02M 15/04; F02M 31/12
[52] U.S. Cl. .................................. 123/545; 123/337; 123/549; 219/206
[58] Field of Search ............... 123/337, 543, 545, 547, 123/549; 219/205, 206, 207

[56] References Cited

U.S. PATENT DOCUMENTS 1,472,246 10/1923 Daniel .............................. 219/207 X
3,916,859 11/1975 Fossum ............................ 123/545 X
4,007,720 2/1977 Brettschneider .
4,483,304 11/1984 Yokoi .

FOREIGN PATENT DOCUMENTS 3118422 12/1982 Fed. Rep. of Germany ...... 123/549
2037894 7/1980 United Kingdom ............... 219/206

Primary Examiner—Tony M. Argenbright
Attorney, Agent, or Firm—Edwin E. Greigg

[57] ABSTRACT

A throttle valve pipe is proposed, which is used for fuel mixture formation for mixture-compressing internal combustion engines with externally supplied ignition. The throttle valve pipe includes an intake conduit and a throttle valve is disposed therein and to control fuel flow. From upstream of the throttle valve fuel can be ejected by an injection valve in the direction toward the throttle valve. The throttle valve is made of ceramic and on its surface which faces the injection valve this valve is provided with an electric heating resistor film. In the pivoting region of the throttle valve, a liner of ceramic is inserted into the intake conduit and the additionally liner surface which forms part of the intake conduit is provided with an electric heating resistor film.

9 Claims, 1 Drawing Figure

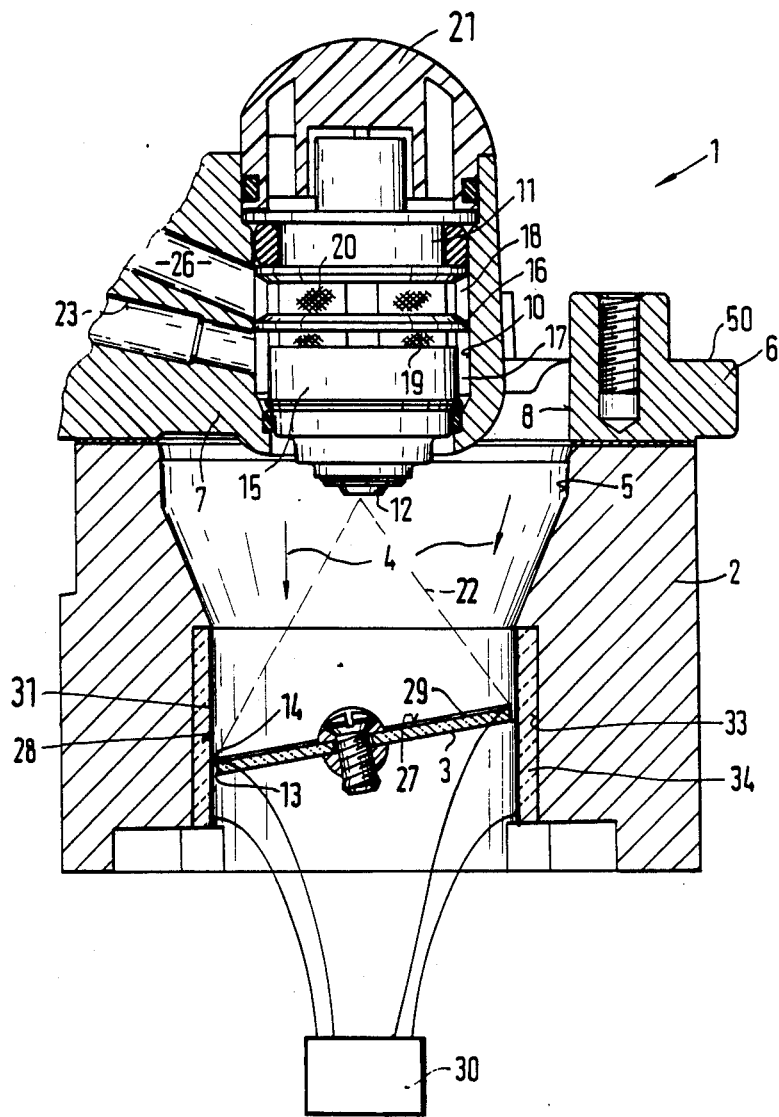

THROTTLE VALVE PIPE

BACKGROUND OF THE INVENTION

The invention is based on a throttle valve pipe of the generic type as defined hereinafter. A throttle valve pipe is already known in which the electric heating body is disposed directly on the metal throttle valve, and the heating of the throttle valve pipe near the throttle valve takes place via the metal wall of the throttle valve pipe. This design has the disadvantage that a majority of the electrically supplied energy at the throttle valve is dissipated because of the good thermal conductivity of the throttle valve, so that increased electrical energy is required for heating purposes. In the same manner, the metal throttle valve pipe undesirably conducts away heat that would be needed for preparing the fuel introduced into the aspirated air flow upstream of the throttle valve.

OBJECT AND SUMMARY OF THE INVENTION

The throttle valve pipe according to the invention has the advantage over the prior art that by decreasing the heat losses that occur and by optimally disposing the heating device, less heating output needs to be supplied, and yet optimal preparation of the fuel still occurs.

A particularly advantageous feature of the invention is for the wall of the intake conduit in the region where the throttle valve pivots, and the throttle valve itself, both to be made of ceramic; the result is not only great thermal resistance but good resistance to corrosive substances as well. It is also advantageous to introduce a ceramic liner into the throttle valve pipe in the pivotal area of the throttle valve, and to provide the liner and the upstream-facing throttle valve surface with an electrically conductive heating resistor film.

The invention will be better understood and further objects and advantages thereof will become more apparent from the ensuing detailed description of a preferred embodiment taken in conjunction with the drawing.

BRIEF DESCRIPTION OF THE DRAWING

The single drawing FIGURE shows generally in cross-section an exemplary embodiment of the throttle valve pipe according to the invention.

DESCRIPTION OF THE PREFERRED EMBODIMENT

In the drawing, a fuel injection apparatus 1 is shown, which is mounted on a throttle valve pipe 2 of an air intake tube of a mixture-compressing internal combustion engine having externally supplied ignition. Instead of the fuel injection apparatus, a carburetor could also be provided. The throttle valve pipe 2 has an intake conduit 5 and in it is disposed a throttle valve 3, by means of which the cross section of the intake conduit 5 is controllable in a known manner so that a greater or lesser quantity of fuel-air mixture can flow to the engine in the direction of the arrows 4.

The fuel injection apparatus 1 has a support 6 mounted on the throttle valve pipe 2 upstream of the throttle valve 3 and includes at least one strut portion 7, which protrudes into an air flow cross section 8 of the support 6 for the air aspirated by the engine; this air flow cross section 8 being associated with the intake conduit 5 of the throttle valve pipe 2. On its end which protrudes into the air flow cross section 8, the strut portion 7 has a stepped reception bore 10, into which an injection valve 11 is introduced concentrically with the intake conduit 5 of the throttle valve pipe. Via the mouthpiece or nozzle 12 of the injection valve 11, fuel can be ejected in the form of a hollow cone 22 toward the throttle valve 3, and effectively directed as much as possible into the annular gap 14 formed between the intake conduit 5 and the circumference 13 of the throttle valve 3. Remote from the nozzle 12, the reception bore 10 is closed off by a jacket 21, which like the strut portion 7 is as steamlined as possible. The injection valve 11 is partially surrounded in the axial direction by a filter 15, which rests with an annular rib 16 on the wall of the reception bore 10 and thus, between the filter 15 and the wall of the reception bore 10, divides an annular fuel supply groove 17 from an annular fuel return groove 18. From the annular fuel supply groove 17, the fuel can flow via a first filter zone 19 to reach the interior of the injection valve 11 in a manner not shown, and from there the fuel can be ejected via the mouthpiece 12 or else partially returns from the injection valve 11, again in a manner not shown, and flows via a second filter zone 20 into the annular fuel return groove 18. A fuel supply conduit 23 which partly extends in the strut portion 7 discharges into the annular fuel supply groove 17; the supply of fuel to the fuel injection apparatus 1 is effected by a fuel source, such as a fuel pump, via this fuel supply conduit 23. Above the fuel supply conduit 23, a fuel return conduit 26 that begins at the annular fuel return groove 18 at the reception bore 10 and leads to a pressure regulating valve is provided in the support 6.

To reduce the toxic components in the engine exhaust gas and to lower fuel consumption, the best possible fuel preparation is desirable. Fuel preparation can be improved by supplying heat, for instance, specifically at locations in the intake tube of the engine at which fuel is deposited and tends to form relatively large fuel droplets. The formation of relatively large fuel droplets comes about on the surface 27 of the throttle valve 3, which faces upstream, and on the surface 28 of the intake conduit in the pivoting region of the throttle valve 3. For this reason, an electrically conductive heating resistor film 29 is applied to the surface 27 of the throttle valve 3; the film 29 can be supplied with current by means of a known regulating circuit in an electronic control unit 30. In the same manner, an electrically conductive heating resistor film 31 is applied to the surface 28 of the intake conduit 5 in the pivoting region of the throttle valve 3, and again this film 31 can be supplied with current by the regulating circuit in the control unit 30. Semiconductor resistors, such as PTC resistors, can also be used in a known manner as heating resistors 29 and 31. In order to keep the heating output of the heating resistor film 29 on the throttle valve 3 as low as possible, the throttle valve 3 is made of a thermal insulation material, perferably ceramic. As a result, the conduction of heat to metal parts of the throttle valve pipe 2 is kept to a minimum. For the same reason, a liner 34 of thermal insulating material, in particular ceramic, is inserted into a stepped bore 33 of the throttle valve pipe 2 in the pivoting region of the throttle valve 3, that is, encompassing the throttle valve 3. The liner 34 forms a part of the intake conduit 5 and it is on the liner 34 that the surface 28 in the pivoting region of the throttle valve 3 is provided, and on which the heating resistor film 31 is applied. Thus heating energy furnished by the heating resistor film 31 is prevented as much as possible from being conducted to the throttle valve pipe 2.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A throttle valve pipe for mixture-compressing internal combustion engines having externally supplied ignition, comprising an intake conduit, a throttle valve disposed in said conduit to control fuel and air flow, said intake conduit and said throttle valve adapted to be heated, said intake conduit further including a wall portion of thermal insulating material in proximity to said throttle valve and said throttle valve made of thermally insulating material.

2. A throttle valve pipe as defined by claim 1, wherein said wall portion of said intake conduit in proximity to said throttle valve and said throttle valve are made of ceramic.

3. A throttle valve pipe as defined by claim 2, wherein said wall portion of said intake conduit in proximity to said throttle valve is embodied by a liner of ceramic material.

4. A throttle valve pipe as defined by claim 1, wherein an electrically conductive heating resistor film is applied to said wall portion of said intake conduit in proximity to said throttle valve.

5. A throttle valve pipe as defined by claim 2, wherein an electrically conductive heating resistor film is applied to said wall portion of said intake conduit in proximity to said throttle valve.

6. A throttle valve pipe as defined by claim 3, wherein an electrically conductive heating resistor film is applied to said wall portion of said intake conduit in proximity to said throttle valve.

7. A throttle valve pipe as defined by claim 1, wherein an electrically conductive heating resistor film is applied to said wall portion of said intake conduit in proximity to said throttle valve and said throttle valve further including an upstream-facing surface provided with an electrically conductive heating resistor film.

8. A throttle valve pipe as defined by claim 2, wherein an electrically conductive heating resistor film is applied to said wall portion of said intake conduit in proximity to said throttle valve and said throttle valve further including an upstream-facing surface provided with an electrically conductive heating resistor film.

9. A throttle valve pipe as defined by claim 3, wherein an electrically conductive heating resistor film is applied to said wall portion of said intake conduit in proximity to said throttle valve and said throttle valve further including an upstream-facing surface provided with an electrically conductive heating resistor film.

* * * * *